Patented Apr. 15, 1941

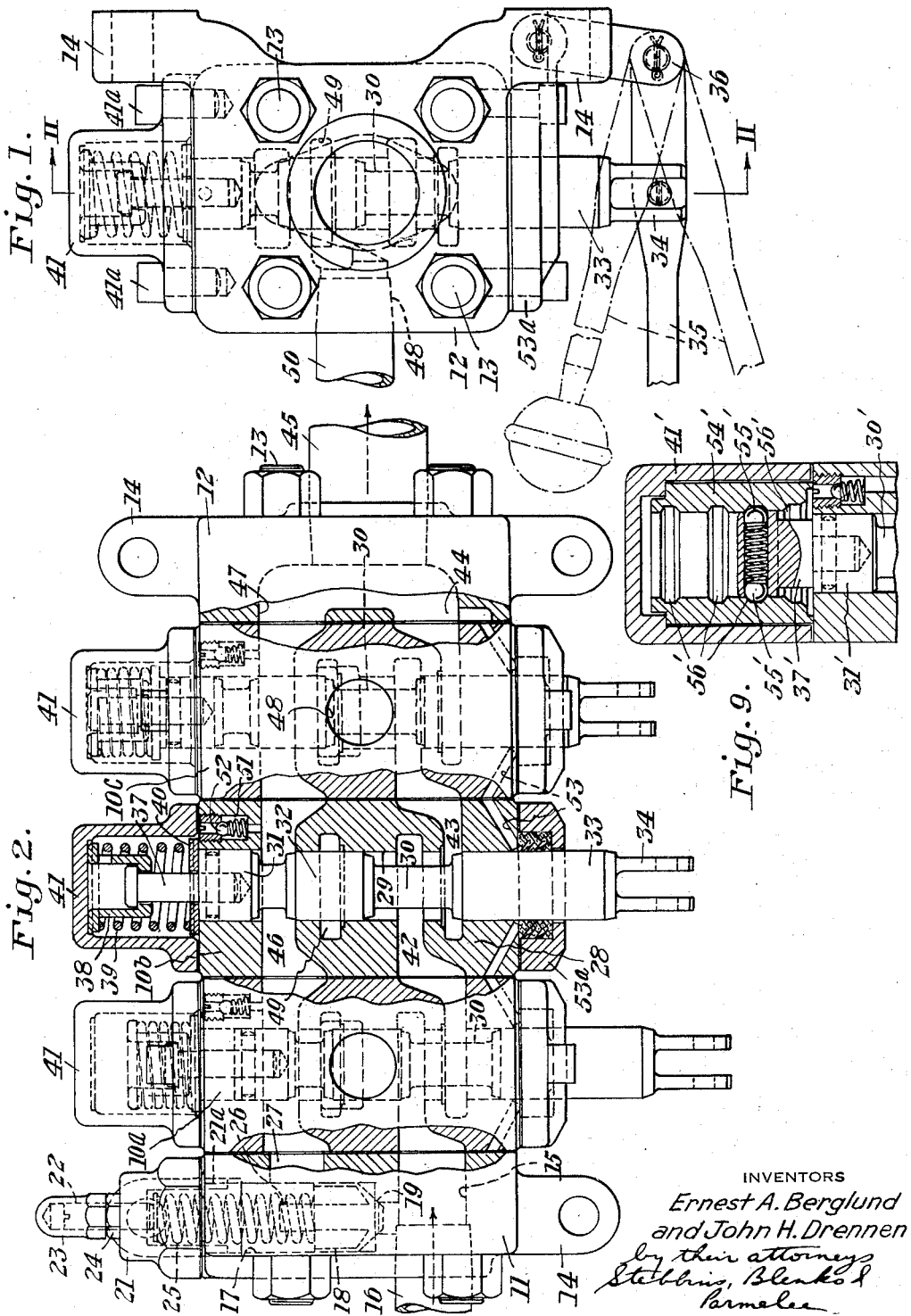

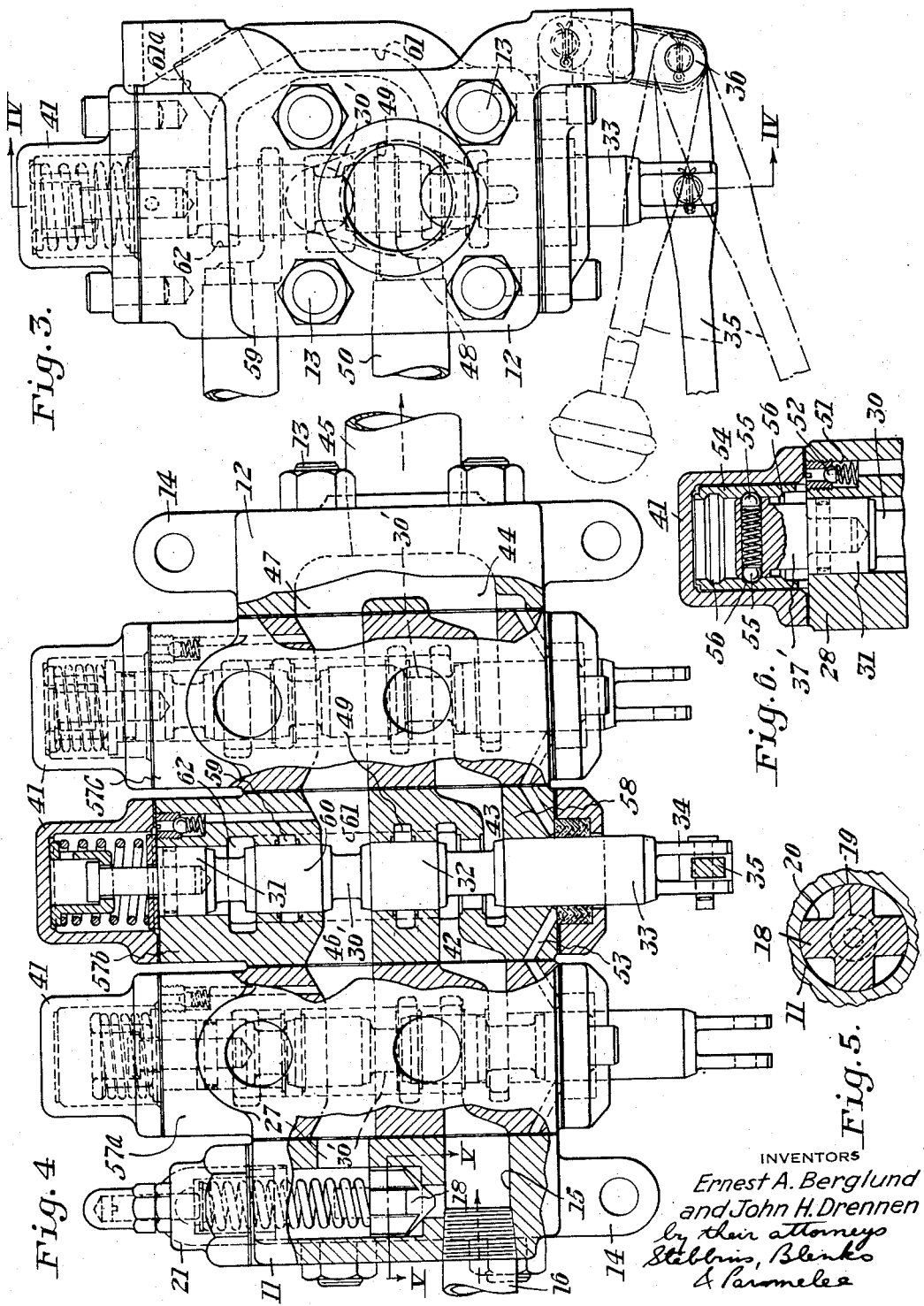

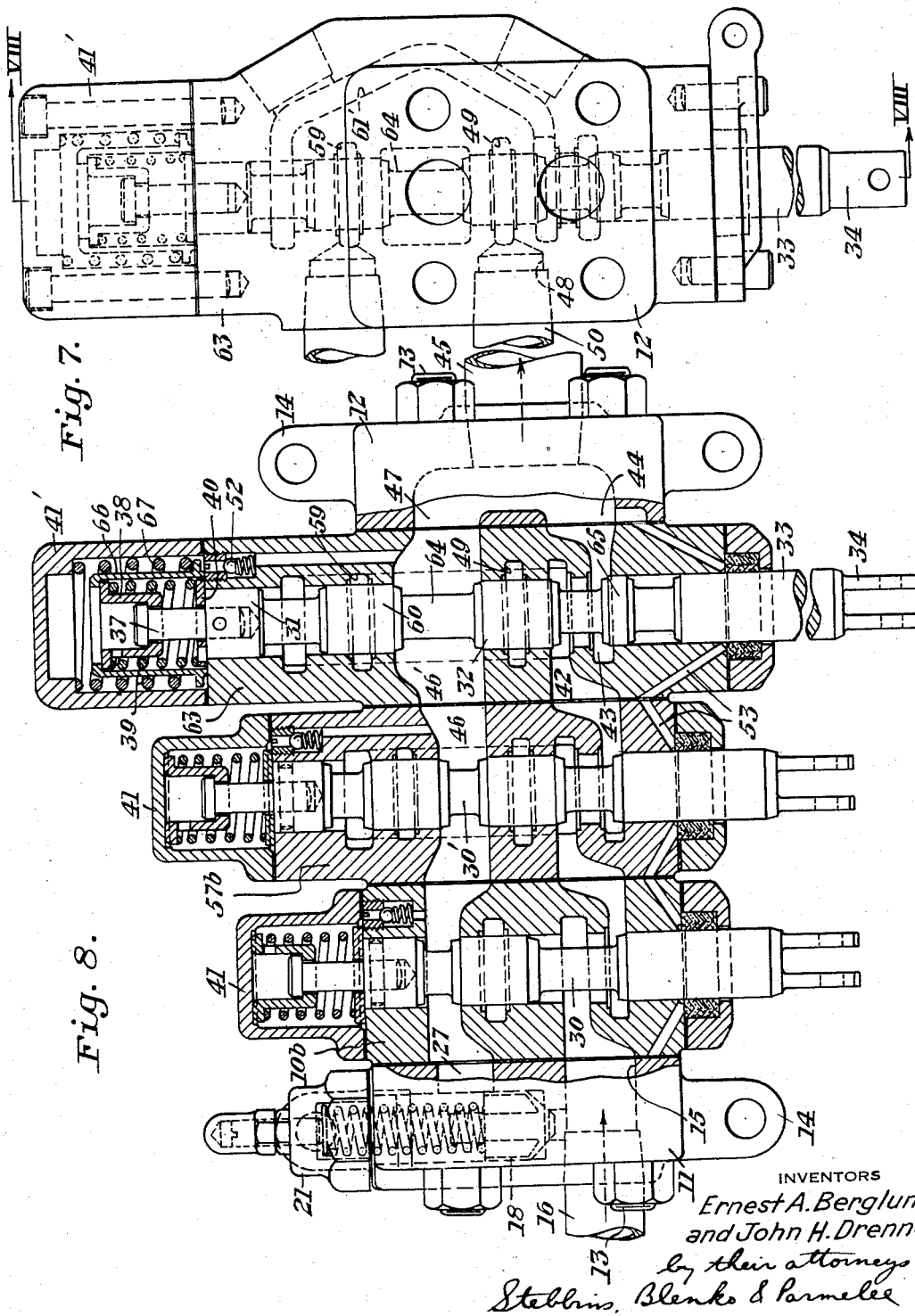

2,238,768

UNITED STATES PATENT OFFICE 2,238,768

CONTROL VALVE

Ernest A. Berglund, Youngstown, and John H. Drennen, Girard, Ohio, assignors to The Commercial Shearing and Stamping Company, Youngstown, Ohio, a corporation of Ohio Application November 2, 1939, Serial No. 302,564

12 Claims. (Cl. 277—63)

This invention relates to valves and, in particular, to valves adapted to control the flow of fluid in hydraulic power-transmission systems.

It is frequently desirable to provide a multiple valve for controlling a plurality of hydraulic motors such as jacks, by assembling standard units of different types. Such multiple-unit control valves have been known heretofore but have been characterized by certain objectionable features, e. g., large size, complex structure and high cost. The object of the present invention is to improve generally upon the multiple-unit control valves known heretofore by providing a valve which is small in size, simple and compact in construction and less costly to manufacture than those known heretofore. The invention also contemplates certain novel details of construction, including an improved relief valve, means for holding the control element of the valve in its various operated positions, and a valve unit having a "float" position in which both ends of a double-acting cylinder are connected to the low-pressure side of the hydraulic system, thereby permitting free movement of the member controlled by the piston in the cylinder.

The invention may be best undertsood by considering the accompanying drawings illustrating several preferred embodiments, in connection with the following detailed description. In the drawings, Fig. 1 is an end elevation of a multiple-unit control valve, each unit of which is adapted to control a single-acting hydraulic jack;

Fig. 2 is a view partly in section along the line II—II of Fig. 1, the control members of the several units being illustrated in the different positions to which they are movable;

Fig. 3 is a view similar to Fig. 1 showing a valve composed of a plurality of units adapted to control double-acting jacks;

Fig. 4 is a view partly in section along the line IV—IV of Fig. 3;

Fig. 5 is a partial section through the relief valve, taken along the line V—V of Fig. 4;

Fig. 6 is a partial section taken along the same plane as Fig. 2, showing a modified form of positioning means for the control members of the valves;

Fig. 7 is a view similar to Fig. 1 with a part removed, of a multiple-unit valve including units adapted to control both single and double-acting jacks, one of the double-acting units having a "float" position;

Fig. 8 is a view partly in section along the plane of line VIII—VIII of Fig. 7;

Fig. 9 is a view similar to Fig. 6 showing the positioning means for the control valve unit having a "float" position.

Referring now in detail to the drawings and, for the present, to Figs. 1 and 2, the multiple-unit valve there shown comprises a plurality of identical units 10a, 10b and 10c assembled between an inlet cover 11 and an outlet cover 12. The several units and covers are held in assembled relation, with gaskets therebetween, by through bolts 13 extending through holes therein which are in alinement when the units and covers are in proper registration. The covers 11 and 12 have feet 14 formed thereon whereby the valve may be secured to any suitable support.

The assembled valve is adapted to be connected in a hydraulic power-transmission system including a tank or reservoir for the operating fluid such as oil, a pump, and a plurality of single-acting hydraulic jacks. Such systems are well-known and illustration and further description thereof are unnecessary.

The inlet cover 11 is provided with a passage 15. A pipe connection 16 from the pump extends into the passage 15, being screwed into a hole in the cover. The cover 11 also has a bore 17 therein adapted to receive a relief valve 18. The bore 17 intersects the passage 15 and is restricted at the point of intersection, forming a seat 19 for the valve 18. The valve 18 is in the form of a cylindrical plug tapered at its lower end, having circumferentially spaced, longitudinal flutes 20. These flutes terminate short of the seat-engaging portion of the valve plug as shown in Fig. 2.

A cap 21 has a reduced neck 21a threaded into the bore 17. An adjusting screw 22 is threaded into the cap 21. An acorn-nut 23 and a locknut 24 are threaded on the screw 22 which is slotted at its upper end for engagement by a screw driver. A compression spring 25 bears against a washer engaged by the screw 22 and against the upper face of the valve 18 which has a projection 26 extending into the spring. The screw 22 may be adjusted by removing the nut 23 and backing off the nut 24, to cause the spring 25 to exert the desired pressure tending to seat the relief valve 18.

So long as the valve 18 remains seated, oil delivered by the pump through the pipe 16 must flow through the passage 15. When the pressure in the passage 15 increases sufficiently, the valve 18 is displaced from its seat and oil flows through the bore 17 and thence through a lateral passage 27 intersecting the bore. The flutes 20 permit free flow of the oil past the valve 18 once it has been displaced from its seat.

Each of the valve units 10a, 10b and 10c comprises a block 28 having a longitudinal bore 29 therethrough. The control member of the valve is in the form of a stem 30 having spools 31, 32 and 33 spaced therealong. A clevis 34 is formed at the lower end of the stem for pivotal connection to an operating lever 35. As shown in Fig. 1, the lever 35 is pivoted to a link 36.

A headed extension 37 of the stem 30 is pinned to the spool 31 and cooperates with a stem-positioning means including a thimble 38 and a spring 39. The thimble has an inturned flange engaging under the head of the extension 37 and an out-turned flange extending outwardly over the spring 39. The spring is normally compressed between the thimble and a washer 40 on the upper face of the block 28. The stem extension 37 of the positioning means is enclosed in a cup-shaped housing 41 secured to the block 28 by screws 41a. The stems 30 of all units are normally maintained by the spring and thimble, in the position in which the stem 30 of unit 10b is illustrated. The stem may be moved downwardly or upwardly from the normal position, to the positions in which the stems of the units 10a and 10c are illustrated. The downward movement of the stems is limited by the engagement of the thimble 38 with the washer 40. Upward movement of the stems is limited by engagement of washer 40 with thimble 38.

Each unit is provided with an inlet passage 42 extending inwardly from one side of the block 28 and intersecting the bore 29. An outlet passage 43 extends inwardly from the opposite face of the block 28 and intersects the bore 29. It will be observed that the passages are enlarged at their intersections with the bore to permit flow of the fluid entirely around the stem. The outer end of the passage 42 is shaped and positioned to register with the passage 15 in the cover 11. The outer end of the passage 43 is shaped and positioned to register with the outer end of the inlet passage of an adjacent unit. By this construction, the passages 42 and 43 of the several units provide a continuous path for the flow of oil, so long as the portion of the bore 29 between the inlet and outlet passages is not closed by the spool 33.

The cover 12 has a passage 44 registering with the outer end of the outlet passage 43. A pipe 45 extends from the cover 12 to the storage tank. With the valve stems 30 in neutral position, therefore, oil flows through the valve under low pressure.

The block 28 of each of the valve units is also provided with a transverse passage 46 intersecting the bore 29. The ends of the passages 46 of the several units register with each other, with the passage 27 in the cover 11 and with a passage 47 in the cover 12 which communicates with the passage 44 and the return pipe 45. When the relief valve is opened, under conditions which will be described later, oil flows through the passages 46 in series and thence to the tank.

A tapped hole 48 extends inwardly from one side of each valve unit and intersects the bore 29, being enlarged at the point of intersection forming a motor port 49. A pipe connection 50 extends from the port 49 to the hydraulic jack.

The interior of the housing 41 of each unit is connected to the passage 46 thereof by a bore 51, the lower end of which is restricted. A spring-urged ball check valve 52 is seated in the bore 51, being held therein by a bushing threaded into the bore.

Angular bores 53 extend inwardly from the lateral faces of each block 28 and intersect the bore 29. The outer ends of the passages 53 of adjacent blocks are in registration when the latter are assembled.

Each valve unit is provided with a packing gland 53a secured to the block 28 by screws and cooperating with the spool 33. The gland provides a fixed fulcrum for the link 36.

The operation of the valve shown in Figs. 1 and 2 will now be explained, assuming first that the valve stems of all units are in the neutral position (that in which the stem of unit 10b is illustrated) and that the pump is operating to supply fluid to the valve through the inlet pipe 16. As already stated, the inlet and outlet passages 42 and 43 are in communication when the valve stems are in their neutral position, providing a free by-pass for the oil which is drawn from and returned to the tank at low pressure. With the valve stems in neutral position, the spools 32 thereof overlap the intersection of the motor port with the bore 29.

If it is desired to operate the jack controlled by one of the units, the appropriate operating lever 35 is shifted to the upper position. This position of the valve stem is illustrated in unit 10c. As there shown, the spool 33 closes the portion of the bore 29 between the passages 42 and 43, thereby preventing further circulation of oil through the valve at low pressure. Simultaneously, the spool 32 uncovers the motor port 49 and the latter is placed in communication with the inlet passage 42. Oil is thus supplied through the pipe 50 to the jack to extend the latter. The upper position of the valve stem is thus known as the "raise" position.

When the jack has been raised to the desired extent, the valve stem is restored to neutral. The spool 32, by closing the port 49, traps in the jack the fluid supplied thereto, thereby holding it elevated. The neutral or central position of the valve stem is, therefore, known as the "hold" position. When it is desired to lower the jack, the stem of its control valve is moved to its lowermost position, that in which the stem of unit 10a is illustrated. As clearly shown in the drawings, this places the port 49 in communication with the passage 46 so that the oil in the jack may flow back through the outlet cover 12 and pipe 45 to the tank. At the same time, the by-pass through the passages 42 and 43 is maintained for continuous circulation of oil by the pump.

The relief valve 18 is raised if the pressure required to operate one of the jacks is excessive, thus preventing injury to the valve or pipe connections. As previously stated, when the relief valve 18 is operated, the oil flows through the passages 46 and 47 to the return pipe 45.

The bleeder passages 53 serve to conduct any oil leaking past the spools 33 to the passage 44. The bleeder passages 51 and valves 52 permit any oil leaking past the spools 31 to be displaced and flow into the passages 46. The valves 52 also prevent back pressure from being applied to the spools 31 which might otherwise be sufficient to shift the valve stems contrary to the desires of the operator. Such back pressures are sometimes created when lowering two jacks simultaneously with continued circulation of oil through the by-pass, particularly if pipe 45 is too small to carry the total volume of flow produced by the pump and the lowering of the jacks.

Fig. 6 illustrates a modified form of positioning means for the valve illustrated in Figs. 1 and 2. It comprises a valve stem extension 37' pinned to the spool 31, cooperating with a sleeve 54 in the housing 41. The extension 37' has a transverse bore therethrough adapted to receive ball detents 55 with a compression spring therebetween. The sleeve 54 has grooves 56 therein adapted to be entered by the balls 55. The grooves 56 are positioned to correspond with the several positions of the stem 30, i. e., hold, raise and lower. The ball detents are sufficient to hold the valve stems in the desired positions but yield readily to manual effort applied to the operating levers 35.

Figs. 3 and 4 illustrate a multiple-unit valve similar to that already described except that the units are adapted to control double-acting jacks. The double-acting valve is composed of units 57a, 57b and 57c assembled between covers 11 and 12. The valve units of Figs. 3 and 4 differ from those of Figs. 1 and 2 in that each unit includes a block 58 having a second motor port 59, and an additional spool 60 on the stem 30'. The block of the double-acting unit also has a passage 61 extending laterally from its inlet passage 42 and upwardly therefrom to intersect the bore 29 adjacent the second motor port 59 as shown at 62. A hole 61a is drilled into the block, intersecting the passage 61, to permit the core forming the latter to be blown out, as by a sandblast, the hole 61a being permanently plugged after removal of the core.

The operation of the double-acting units is similar to that of the single-acting units except that one motor port is placed in communication with the by-passing passage and the other with the relief passage, in either of the extreme positions of the valve stem. When one of the valve stems 30' is moved to its lower position, i. e., that in which the stem of unit 57a is shown, the spool 32 closes the bore 29 between the inlet and outlet passages 42 and 43, thus interrupting the normal by-pass. In this position of the stem, the motor port 49 is in communication with the relief passage 46. The oil delivered through the inlet 16 flows through the passage 61 which branches laterally from the passage 42. The upper end of the passage 61 is in communication with the motor port 59 whereby the jack is operated.

When the valve stem is raised to its upper position, i. e., that in which the stem of unit 57c is illustrated, the by-pass is closed by the spool 33. The motor port 59 is in communication with the relief passage 46. The spool 60 overlaps the passage 61, so the oil entering the inlet passage flows through the motor port 49 to operate the jack in a reverse direction. In other respects, the construction and operation of the double-acting valve are similar to that of the single-acting valve and further detailed description of the former is unnecessary.

The modified form of valve stem positioning means shown in Fig. 6 may obviously be applied to the double-acting valve units as well as to the single-acting unit.

Figs. 7 and 8 illustrate an assembly of single and double-acting valve units. The construction of units of both types is such that they may be interchangeably assembled, in any order, without affecting their manner of operation in the slightest. Figs. 7 and 8 also illustrate a further modified form of double-acting valve unit having a "float" position. The valve shown in Figs. 7 and 8 comprises units 10b, 57b and 63 assembled between end covers 11 and 12 in the same manner as the valves already described. The unit 63 is generally similar to the unit 57b but differs slightly therefrom in size and in the arrangement of its several ports and spools. The stem 64 of the unit 63 has an additional spool 65. The stem 64 may be moved from its neutral or hold positions illustrated in Fig. 8, to raise and lower positions, as in the case of the units of the valves shown in Figs. 3 and 4, and to a fourth position in which both the motor ports 49 and 59 are connected to the relief passage 46'.

This "float" position of the valve stem 64 is above the "raise" position. To permit movement of the stem to a position above the normal raise position, the unit 63 has a housing 41' somewhat larger than the housings 41. The upper flange of the thimble 38 on the valve stem extension 37 cooperates with an inturned flange at the upper end of a sleeve 66. The sleeve 66 is reciprocable in the housing 41' but is normally urged downward by a compression spring 67 engaging an out-turned flange on the sleeve. The spring 39 functions as usual to hold the valve stem in neutral position. The spring 67, however, is stronger than the spring 39 so that the sleeve 66 is normally held down against the upper end of the block of the unit 63.

After the stem 64 has been moved up to the raise position in which the spring 39 is fully compressed and the washer 40 engages the thimble 38, the stem may be moved upward still further by applying sufficient force to the operating lever to compress the spring 67. The final limit of the upward movement of the stem is determined by the engagement of the sleeve 66 with the housing 41'. In that position of the valve stem, the spool 32 is disposed substantially centrally of the passage 46'. This passage, at its intersection with the bore 29 is slightly wider than the length of the spool 32. This permits oil to flow from both ends of the cylinder through both motor ports 49 and 59, into the passage 46'. The piston may, therefore, be freely reciprocated in the cylinder by such external forces as may be applied to it. At the same time, the spool 65 clears the bore 29 between the inlet and outlet passages 42 and 43 permitting continued by-passing of oil. Thus if the unit 63 is located to the left of other units as it may sometimes be, the latter may be operated while the stem 64 is in the float position. The spool 65 also cuts off the motor port 49 from the inlet passage 42 while the spool 60 cuts off the passage 61' from the motor port 59.

The unit 63 may be used as an ordinary double-acting unit if desired. Since the float position of its stem is at one extremity of the latter's movement, the stem does not have to pass through the float position to effect complete control of a double-acting jack.

Fig. 9 illustrates a modification of the stem positioning means shown in Fig. 6 adapted to be incorporated in the unit 63. Corresponding elements thereof are designated by the same reference numerals which are primed in the case of elements similar to but not identical to those in Fig. 6 and no further description thereof appears to be necessary.

It will be apparent from the foregoing description and explanation that the invention provides a control valve characterized by numerous novel features. In the first place, the size of the unit is much smaller than previous units of corresponding type, i. e., single-acting or double-acting. The construction of the individual valve units, furthermore, is relatively simple so they can be manufactured at reasonable cost. The novel relief valve permits a free flow of oil once the valve has been raised. This reduces chattering and wear on the valve seat. The ball check valves in the bleeder passages prevent accidental operation of the valve stems by the back pressure in the return line. The several types of valve units are interchangeable and the "float" position of one type of double-acting units permits free movement of the piston in the cylinder of the hydraulic jack.

The ball detents provide a highly desirable form of positioning means for the valve stems. The use of opposed detents with a compression spring therebetween provides accurately balanced forces thereby preventing any tendency of the stem to bind in its bore. The constructions utilizing the ball detents, furthermore, are fully interchangeable with the spring and thimble construction of stem positioning means shown in Figs. 1–4, 7 and 8.

Although we have illustrated and described but a preferred embodiment with certain modifications, it will be understood that changes in the design and arrangement disclosed may be made without departing from the spirit of the invention or the scope of the appended claims.

We claim:

1. A valve unit comprising a block adapted to be assembled between inlet and outlet covers, a bore through said block, a relief passage intersecting said bore, by-passing passages extending into said block from opposite faces and intersecting said bore at points closely spaced therealong, a motor port intersecting said bore between the relief passage and one of the by-passing passages, a valve stem reciprocable in said bore having spools spaced therealong, a housing on one end of the block, stem-positioning means in said housing, a bleeder passage connecting the interior of said housing to said relief passage, and a valve in said bleeder passage preventing flow from said relief passage to said housing.

2. A valve unit comprising a block adapted to be assembled between inlet and outlet covers, a bore through said block, a relief passage intersecting said bore, by-passing passages extending into said block from opposite faces and intersecting said bore at points closely spaced therealong, a motor port intersecting said bore between the relief passage and one of the by-passing passages, a second motor port intersecting said bore on the opposite side of the relief passage from the first-mentioned motor port, a branch passage intersecting said bore adjacent the second motor port, said branch passage extending from the by-passing passage extending into the block from the side thereof nearer the inlet cover, and a valve stem reciprocable in said bore having spools spaced therealong, whereby said passages may be selectively connected through portions of said bore.

3. A valve unit as defined by claim 2 and characterized by said branch passage being formed in said block and lying to one side of said bore.

4. A valve unit comprising a block adapted to be assembled between inlet and outlet covers, a bore through said block, a relief passage intersecting said bore, by-passing passages extending into said block from opposite faces and intersecting said bore at points closely spaced therealong, a motor port intersecting said bore between the relief passage and one of the by-passing passages, a second motor port intersecting said bore on the opposite side of the relief passage from the first-mentioned motor port, means providing communication from a point in said bore adjacent said second motor port to the by-passing passage extending into the block from the side thereof nearer the inlet cover, and a valve stem reciprocable in said bore having spools spaced therealong, whereby said passages may be selectively connected through portions of said bore.

5. A valve comprising a block having a bore therethrough, a relief passage intersecting said bore, inlet and outlet passages intersecting said bore at points closely spaced therealong, a motor port intersecting the bore between the relief passage and the inlet passage, a second motor port intersecting the bore on the opposite side of the relief passage from the first-mentioned motor port, means providing communication from a point in said bore adjacent said second motor port to the inlet passage, and a valve stem reciprocable in said bore having spools spaced therealong whereby said passages may be selectively connected through portions of said bore.

6. A valve as defined by claim 5 characterized by said relief passage being wide enough to communicate with both motor ports when one of the spools is positioned substantially centrally of the relief passage.

7. A valve as defined by claim 5 characterized by said relief passage being of such size and shape as to communicate with both motor ports when one of said spools is disposed substantially centrally between the motor ports.

8. A valve comprising a block having a bore therethrough, a relief passage intersecting said bore, inlet and outlet passages intersecting said bore at points closely spaced therealong, a motor port intersecting the bore between the relief passage and the inlet passage, a second motor port intersecting the bore on the opposite side of the relief passage from the first-mentioned motor port, means providing communication from a point in said bore adjacent said second motor port to the inlet passage, and a valve stem reciprocable in said bore having spools spaced therealong adapted to overlie said motor ports, and a spool adapted to overlie said outlet passage, said relief passage being of such size and shape as to communicate with both motor ports when one of said motor-port spools is disposed substantially centrally of the relief passage, and said outlet-passage spool being of such size as to permit flow through the inlet and outlet passages when said one of the motor-port spools is disposed substantially centrally of the relief passage.

9. A valve comprising a block having a bore therethrough, a relief passage intersecting said bore, inlet and outlet passages intersecting said bore at points closely spaced therealong, a motor port intersecting the bore between the relief passage and the inlet passage, a second motor port intersecting the bore on the opposite side of the relief passage from the first-mentioned motor port, means providing communication from a point in said bore adjacent said second motor port to the inlet passage, and a valve stem reciprocable in said bore having spools spaced therealong adapted to overlie said motor ports, and a spool adapted to overlie said outlet passage, said relief passage being of such size and shape as to communicate with both motor ports when one of said motor-port spools is disposed substantially centrally of the relief passage.

10. A valve comprising a block having a bore therethrough, a relief passage intersecting said bore, inlet and outlet passages intersecting said bore at points closely spaced therealong, a motor port intersecting the bore between the relief passage and the inlet passage, a second motor port intersecting the bore on the opposite side of the relief passage from the first-mentioned motor port, and a valve stem reciprocable in said bore having spools spaced therealong whereby said passages may be selectively connected through portions of said bore, said relief passage being wide enough to communicate with both motor ports when one of the spools is positioned substantially centrally of the relief passage.

11. A valve comprising a body having a bore therethrough, a relief passage intersecting said bore, inlet and outlet by-passing passages extending into said body and intersecting said bore at points closely spaced therealong, a motor port intersecting said bore between the relief passage and one of said by-passing passages, a second motor port intersecting said bore on the opposite side of the relief passage from the first-mentioned motor port, a branch passage intersecting said bore adjacent the second motor port, said branch passage extending from the inlet by-passing passage, and a valve stem reciprocable in said bore having spools spaced therealong whereby said passages may be selectively connected through portions of said bore.

12. A valve as defined by claim 11 characterized by said relief passage being of such size and shape as to communicate with both motor ports when one of said spools is disposed substantially centrally between the motor ports.

ERNEST A. BERGLUND.
JOHN H. DRENNEN.